(12) United States Patent
Kawahito et al.

(10) Patent No.: US 7,278,138 B2
(45) Date of Patent: Oct. 2, 2007

(54) COMPUTER PROGRAM CONVERSION AND COMPILATION

(75) Inventors: Motohiro Kawahito, Sagamihara (JP); Kideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/102,389

(22) Filed: Mar. 19, 2002

(65) Prior Publication Data
US 2002/0144097 A1  Oct. 3, 2002

(30) Foreign Application Priority Data
Mar. 30, 2001 (JP) .............. 2001-102343

(51) Int. Cl.
*G06F 9/45* (2006.01)
(52) U.S. Cl. .............. 717/159; 717/153; 717/155
(58) Field of Classification Search ......... 717/153–156
See application file for complete search history.

(56) References Cited

U.S. PATENT DOCUMENTS

| 4,642,765 A | * | 2/1987 | Cocke et al. | ............ 717/153 |
| 5,457,799 A | * | 10/1995 | Srivastava | ............ 717/160 |
| 5,694,605 A | * | 12/1997 | Miyaji et al. | ............ 717/153 |
| 5,761,469 A | * | 6/1998 | Greenley | ............ 712/210 |
| 5,768,596 A | * | 6/1998 | Chow et al. | ............ 717/154 |
| 5,809,306 A | * | 9/1998 | Suzuki et al. | ............ 717/143 |
| 6,098,087 A | * | 8/2000 | Lemay | ............ 708/209 |
| 6,571,387 B1 | * | 5/2003 | Chow et al. | ............ 717/156 |
| 6,681,313 B1 | * | 1/2004 | Trong et al. | ............ 711/207 |

FOREIGN PATENT DOCUMENTS

| JP | 62-269238 | 11/1987 |
| JP | 06-337792 | 12/1994 |

OTHER PUBLICATIONS

Kawahito, et al., "A Method for Elimination of Redundant Sign Extensions", *Journal of Information Processing Society of Japan*, Jan. 15, 2002, vol. 43, No. SIG1 (PRO13); pp. 60-74.

* cited by examiner

*Primary Examiner*—Tuan Dam
*Assistant Examiner*—Michael Yigdall
(74) *Attorney, Agent, or Firm*—Scully, Scott, Murphy & Presser, P.C.; Lisa M. Yamonaco, Esq.

(57) ABSTRACT

The present invention provides methods, apparatus, and systems to remove a redundant, sign extension instruction from a program and to improve the execution efficiency of the program. In an example embodiment, a conversion program for controlling a computer for the conversion of an execution program, especially a compiler, permits the computer to perform: a function for analyzing a sign extension instruction issued in order to perform the sign extension of a value defined in the execution program; and a function for, in accordance with analysis results, removing a predetermined sign extension instruction from those included in the execution program.

19 Claims, 14 Drawing Sheets

```
bbtable = sort basic blocks in the descending order of expected execution frequencies
for (bb = from the first to the last of bbtable ) {
    for (each I ∈ instruction in bb ) {
        if (I is a sign extension instruction) {
            EliminateOneExtend(I)
        }
    }
}
```

Fig. 8

```
{
    initialization of a flag that is analyzed
    required = TRUE

/* use DU - chain */
    for (I ∈ all instructions using output variable of EXT ) {
        required = < analysis to determine whether Extend instruction is necessary for USE>(EXT, I)
        if (required) break;
    } if (required) {
        /* use UD - chain */
        for (I ∈ all instructions defining input variable of EXT ) {
            required = < analysis to determine whether Extend instruction is necessary for Destination>(I)
            if (required) break;
        }
    } if (!required) {
        remove EXT
    }
}
```

Fig. 9

```
{
    if (I has been analyzed for USE) return FALSE;
    record that I has been analyzed for USE
    switch (I) {
    case clear integer cast instruction :
    case sign extension instruction :
    case comparison instruction using lower 32 bits of a register :
    case instruction for storing lower 32 bits of a register in memory :
    case instruction for storing lower 16 bits of a register in memory :
    case instruction for storing lower 8 bits of a register in memory :
    case right shift instruction without sign :
        return FALSE;          /* EXTEND unnecessary */ case addition instruction :
    case subtraction instruction :
    case multiplication instruction :
    case AND instruction :
    case XOR instruction :
    case OR instruction :
    case left shift instruction :
    case copy instruction :
        for (J ∈ all instructions using output variable for I ) {
            if (<analysis to determine whether Extend instruction is necessary for USE>(EXT, J)) return TRUE;
            /* EXTEND necessary */
        }
        return FALSE;          /* EXTEND unnecessary */ case calculation of address of an array :
        return <analysis to determine whether Extend instruction is necessary for calculation of address of an array>(EXT, I) ;
    }
    return TRUE;               /* EXTEND necessary */
}
```

Fig. 10

```
{
    if (when all instructions using output variable of array address calculation instruction EOP2 are for array access ) {
        for (D ∈ instructions defining an input variable for EXT ) {
            required = TRUE;
            if (upper 32 bits of output variable of D are always initialized as 0) { /* theorem 1 */
                required = FALSE;          /* EXTEND unnecessary */
            } else if (D is an addition instruction ) {
                if (the output variable for D is used at only one location ) {
                    if ( sign extension has been performed for both operands in D to 64 bits &&
                        either operand in D is equal to or greater than -1 ) { /* theorem 3 */
                        required = FALSE;                    /* EXTEND unnecessary */
                    }
                }
            }
            if (required) return TRUE;
        }
        return FALSE;   /* EXTEND unnecessary */
    }
    return TRUE;        /* EXTEND necessary */
}
```

Fig. 11

```
{
    if (I has been analyzed for DEF) return FALSE;
    I is recorded as having been analyzed for DEF
    switch(I) {
    case sign extension has been performed for the output results of I:
    /* for example, sign extension instruction, clear cast instruction., etc. */
        return FALSE;          /* EXTEND unnecessary */ case copy instruction :
        for (J ∈ all instructions defining an input variable for I) {
            if (< analysis to determine whether Extend instruction is necessary for Destination > (J)]    return TRUE;
            /* EXTEND necessary */
        }
        return FALSE;          /* EXTEND unnecessary */
    }
    return TRUE;               /* EXTEND necessary   */
}
```

Fig. 12

```
static int start, end;
void test(int a[]) {
    for (int j = end; --j >= start;) {
        a[j] = j;
    }
}
```

Fig. 13

```
static int start, end;
void test(int a[]) {
    Tend = end;                  - (1)
    Tend = extend(Tend);         - (2)
    Tstart = start;              - (3)
    Tstart = extend(Tstart);     - (4)
    int j = Tend;                - (5)
    j = j - 1;                   - (6)
    j = extend(j);               - (7)
    T1 = arraylength(a);         - (8)
    T1 = extend(T1);             - (9)
    if (j >= Tstart) {           - (10)
        do {
            boundcheck j, T1;    - (11)
            /* check ArrayOutOfBoundsException */
            T2 = a + (j << 2);   - (12) /* array address calculation */
            *T2 = j;             - (13)
            j = j - 1;           - (14)
            j = extend(j);       - (15)
        } while(j >= Tstart);    - (16)
    }
}
```

Fig. 14

```
static int start, end;
void test(int a[]) {
    Tend = end;              - (1)
    Tstart = start;          - (3)
    int j = Tend;            - (5)
    j = j - 1;               - (6)
    j = extend(j);           - (7)
    T1 = arraylength(a);     - (8)
    if (j >= Tstart) {       - (10)
        do {
            boundcheck j, T1;    - (11)
            /* check ArrayOutOfBoundsException */
            T2 = a + (j << 2);   - (12)
            /* array address calculation */
            *T2 = j;             - (13)
            j = j - 1;           - (14)
        } while(j >= Tstart);    - (16)
    }
}
```

Fig. 15

```
static int start, end;
void test(int a[]) {
    Tend = end;              - (1)
    Tstart = start;          - (3)
    int j = Tend;            - (5)
    j = j - 1;               - (6)
    T1 = arraylength(a);     - (8)
    if (j >= Tstart) {       - (10)
        do {
            boundcheck j, T1;    - (11)
            /* check ArrayOutOfBoundsException */
            T2 = a + (j << 2);   - (12)
            /* array address calculation */
            *T2 = j;             - (13)
            j = j - 1;           - (14)
            j = extend(j);       - (15)
        } while(j >= Tstart);    - (16)
    }
}
```

Fig. 16

```
/* assume that mem is 0xffffffff
*/
i = mem + 1;
/*  i is 0x100000000 */
i = extend( i );        - (1)
/*  i is 0 */
a[i] = 0;               - (2)
```

COMPUTER PROGRAM CONVERSION AND COMPILATION

FIELD OF THE INVENTION

The present invention relates to computer compilation. It most particularly relates to a method for removing redundant sign extension instructions from a program to improve execution efficiency of the program.

BACKGROUND ART

When a compiler compiles a program, a value defined in the program that in size is smaller than the size of a CPU register is converted to the size corresponding to that of the register.

For example, for a 64-bit architecture (a 64-bit specification for the use of 64 bits for operations and data transfers and for 64-bit memory addressing), a register image is 64 bits. Therefore, 32 bit, 16 bit and 8 bit values in a program must be handled as 64 bits by using sign extension. Sign extension is a process whereby the value of a code bit, the most significant bit of a defined value is extended into bits added to the defined value in order to obtain a value having a greater bit length.

In a sample program shown in FIG. 18, the function "extend ( )" is used for a sign extension of from 32 bits to 64 bits, and the "i" denotes a 32-bit variable in the program. In this example, assuming that "mem" represents the value 0xffffffff ("−1" for 32 bits with a sign) in a 32-bit memory, an error would occur in an array access (line (2)) if a sign extension instruction (line (1)) is not executed. Therefore, sign extension must be used so that the number of bits employed for a value match the CPU register image.

When a code written in a certain language that mainly employs 32-bit values for operations is to be compiled for use in a 64-bit architecture, not only loading from memory but also sign extension is required for almost all integer instructions. However, when the sign extension instruction is inserted as is shown in line (1) in FIG. 18, the execution speed of the program is accordingly reduced.

Sign extension is also required for a 32-bit architecture (i.e., a 32 bits register size) when 16-bit or 8-bit values are to be processed. On the other hand, for IA-32, which is a 32-bit architecture CPU, processor instructions (MOVSX, MOVZX) are provided for loading an instruction from memory and performing sign extension at the same time. Therefore, when these instructions are employed, the load sign extension imposes on the CPU need not be taken into account.

However, at the present, instructions for loading instructions from memory and performing sign extension at the same time are not generally known for 64-bit architectures. In addition, in the present situation wherein most systems and applications are designed based on the premise that 32-bit architecture will be used, sign extension instructions are actually necessary for many integer instructions, and program execution speeds are reduced.

SUMMARY OF THE INVENTION

It is, therefore, one aspect of the present invention to remove a redundant, sign extension instruction from a program and to improve the execution efficiency of the program.

It is another aspect of the present invention to provide a compiler for removing a redundant sign extension instruction before a program is compiled, and to generate an object program having high execution efficiency.

To achieve the above aspects, according to the present invention, a conversion program, for controlling a computer for the conversion of an execution program, permits the computer to perform: a function for analyzing a sign extension instruction issued in order to perform the sign extension of a value defined in the execution program; and a function for, in accordance with analysis results, removing a predetermined sign extension instruction from those included in the execution program.

BRIEF DESCRIPTION OF THE DRAWINGS

FIG. 8 is a diagram showing an example algorithm for mounting a removal order determination unit in a compiler according to the embodiment;

FIG. 9 is a diagram showing an example algorithm for mounting a sign extension instruction removal unit in the compiler according to the embodiment;

FIG. 10 is a diagram showing an example algorithm used when the sign extension instruction removal unit in the embodiment performs an analysis and a determination relative to the output of a sign extension instruction;

FIG. 11 is a diagram showing an example algorithm used when the sign extension instruction removal unit in the embodiment performs the analysis process for an instruction used to calculate the address of an array;

FIG. 12 is a diagram showing an example algorithm used when the sign extension instruction removal unit in the embodiment performs the analysis and the determination relative to the input of a sign extension instruction;

FIG. 13 is a diagram showing a sample program into which is inserted or from which is removed a sign extension instruction according to the embodiment;

FIG. 14 is a diagram showing an intermediate expression wherein sign extension instructions are generated for predetermined locations in the sample program in FIG. 13;

FIG. 15 is a diagram showing the results obtained by removing the sign extension instructions from the program in FIG. 14 while taking a removal order into account;

FIG. 16 is a diagram showing the results obtained by removing the sign extension instructions from the program in FIG. 14 without taking the removal order into account;

Figure 1:
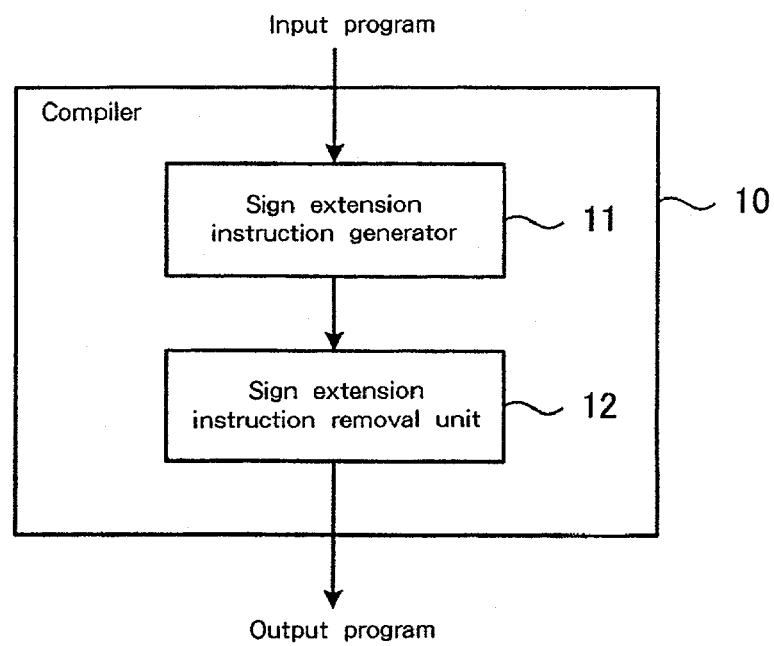
FIG. 1 is a diagram for explaining the general configuration of a compiler according to one embodiment of the present invention.

DESCRIPTION OF THE SYMBOLS 10, 20: Compiler
11, 21: Sign extension instruction generator
12, 23: Sign extension instruction removal unit
22: Removal order determination unit

DESCRIPTION OF THE INVENTION

The present invention provides methods, apparatus and systems for removing a redundant, sign extension instruction from a program and to improve the execution efficiency of the program. It also provides a compiler for removing a redundant sign extension instruction before a program is compiled, and to generate an object program having high execution efficiency.

In an example embodiment of the present invention, a conversion program, for controlling a computer for the conversion of an execution program, permits the computer to perform: a function for analyzing a sign extension instruction issued in order to perform the sign extension of a value defined in the execution program; and a function for, in accordance with analysis results, removing a predetermined sign extension instruction from those included in the execution program.

When sign extension has been performed for a value before the value is input to a sign extension instruction, the sign extension instruction is redundant and should be removed. Further, when the output result of a sign extension instruction is employed at all places it is required using a data size equal to or smaller than the size before sign extension, the sign extension instruction is also redundant and should be removed. Therefore, the function of the conversion program for removing a sign extension instruction includes a function for removing sign extension instructions to which the above conditions apply.

When multiple sign extension instructions are to be selectively removed, the function for removing the sign extension instruction removes sign extension instructions having high execution frequencies. The conversion program can be provided by being recorded on a storage medium, such as a magnetic disk, an optical disk or a semiconductor memory, or by being retrieved from the storage device of a program transmission apparatus and transmitted via a network.

According to the invention, a compiler, for converting into machine language code the source code for a program written in a programming language, comprises: a correction instruction generator, for adding to the program a correction instruction for correcting the sizes of data and values defined in the program that are smaller than the sizes of registers provided for a CPU that executes the program; and an instruction removal unit, for removing from the program predetermined correction instructions that have been added by the correction instruction generator.

The correction instructions that are added under specific conditions to perform address calculations for array accesses are redundant and should be removed by the instruction removal unit. The specific conditions include conditions defined as being based on language specifications. When one of two correction instructions for a predetermined value is outside while the other is inside a loop in the program, the instruction removal unit removes the correction instruction located inside the loop. Further, to remove a correction instruction that matches the condition, the instruction removal unit can employ a use-definition chain and a definition-use chain.

According to the invention, a computer comprises: a compiler, for compiling source code for a program by converting the source code into machine language code; and a processor, for executing the resultant machine language code, wherein, in order to perform the sign extension of values defined in the program, the compiler removes a predetermined sign extension instruction, one of those inserted in the program.

When the sign extension has already been performed for a value before the value is input for the predetermined sign extension instruction, or when the results output for the predetermined sign extension instruction are employed for all necessary locations having a data size equal to or smaller than the size before sign extension, the compiler removes these sign extension instructions. Further, under a specific condition, the compiler removes the correction instruction added for address calculation for array accesses. Further, the compiler examines each sign extension instruction, beginning with the highest, to determine whether it is redundant and removes a redundant instruction.

According to the present invention a program conversion method for controlling a computer to convert an execution program comprises the steps of: adding a sign extension instruction issued to perform sign extension for a value defined in the execution program; and removing a redundant instruction from among the sign extension instructions added to the execution program.

Figures 17, 18:
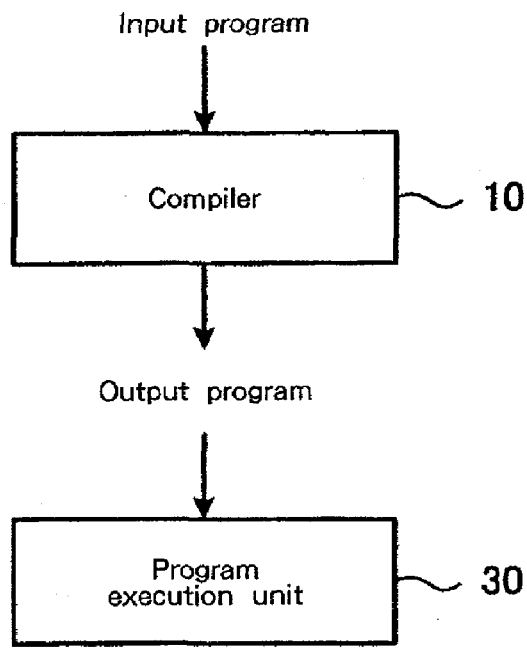
FIG. 17 is a diagram showing the system configuration of a computer that employs the compiler of the invention.
FIG. 18 is a sample program for explaining the need for a sign extension instruction.

Advantageous embodiments of the present invention will now be described in detail while referring to the accompanying drawings. FIG. 17 is a diagram showing the system configuration of a computer that employs a compiler according to the embodiment. In FIG. 17, the compiler 10 receives and processes a program written in byte code, and generates and outputs a program written in a machine language.

In the embodiments, the compiler 10 may be either a JIT (Just In Time) compiler for Java, which dynamically compiles an execution program at the time of execution, or a compiler that generates an object program by compiling a source program in advance and employs this program as an execution program. The program generated and output by the compiler 10 is executed by a program execution unit 30.

FIG. 1 is a diagram for explaining the general configuration of a compiler according to one embodiment of the invention. For this embodiment, an input program is written on the assumption that it will be used by a CPU having a 32-bit architecture. Whereas the program compiled and output by the compiler 10 in FIG. 1 is for a CPU having a 64-bit architecture. Therefore, while the compiler 10 converts the source code of an input program and outputs a program written in a machine language code, the compiler 10, as necessary, inserts sign extension instructions into portions of the program.

In FIG. 1, the compiler 10 in this embodiment comprises: a sign extension instruction generator 11, for generating sign extension instructions to be added to an execution program, and a sign extension instruction removal unit 12, for removing unnecessary sign extension instructions. The individual components of the compiler 10 in FIG. 1 are virtual software blocks implemented by a CPU controlled by a computer program. The computer program that controls the CPU can be provided by being stored on a storage medium, such as a CD-ROM or a floppy disk, or by being transmitted via a network.

The components of the compiler 10 in FIG. 1 are related to the characteristic functions of the embodiment. Although not shown, in actuality the compiler 10 has other general functions that are required for the compiling process, including the phrase and syntax analysis of an input program and the generation of machine language code.

In the compiler 10, the sign extension instruction generator 11 generates sign extension instructions, which are correction instructions for expanding from 32 to 64 bits predetermined values in a program that is being compiled, and inserts the sign extension instructions into predetermined locations in the program. The locations whereat sign extension instructions are inserted are all those whereat the sizes of defined data variables are smaller than the size (64 bits) of the registers provided for the architecture of the computer that will execute the compiled program.

Two methods are used to insert sign extension instructions into a program: a method whereby an instruction is inserted into a location whereat a variable is defined, and a method whereby an instruction is inserted into a location whereat a variable is employed. However, when the second method is employed and sign extension instructions are inserted into loops in the program, using a process, which will be described later, for removing redundant sign extension instructions, merely removing a sign extension instruction is not sufficient, an additional process is required to move sign extension instructions included in loops outside the loops. While when sign extension instructions are inserted using the first method, corresponding sign extension instructions must be moved outside loops only when optimization is performed to move outside loops the locations whereat variables are defined. In this manner, the number of procedures can be reduced.

Generally, the number of locations whereat variables are used is greater than the number of locations whereat variables are defined. Therefore, for the optimization of sign extension instructions, the method whereby sign extension instructions are inserted into locations whereat variables are used requires more time than the method whereby sign extension instructions are inserted into locations whereat variables are defined. Therefore, it is advantageous that sign extension instructions be inserted into locations whereat variables are defined.

Of the sign extension instructions that are inserted into a program by the sign extension instruction generator 11, the sign extension instruction removal unit 12 removes only those sign extension instructions that are redundant. The following two types of sign extension instructions can be removed.
1. A case wherein sign extension has already been performed for values input to a sign extension instruction.
2. A case wherein the results output by a sign extension instruction are used at all locations whereat data is used that is smaller than or equal in size to that which is input.

When the above two conditions are employed to remove sign extension instructions, the removal process can be performed at the following two steps. First, backward data flow analysis is employed to determine whether the results, for a data size (32 bits for a sign extension of from 32 bits to 64 bits) equal to or smaller than the one before sign extension, output by each sign extension instruction are used at all required locations. Thereafter, the sign extension instructions for which this condition is matched are removed. Next, forward data flow analysis is employed to determine for each sign extension instruction whether sign extension has already been performed for input values. Then, sign extension instructions for which this condition is matched are removed. These two steps in the removal process may be performed in random order, or only one of these steps may be performed, although the effect on program efficiency produced by the removal of redundant instructions will be reduced.

Figure 2:
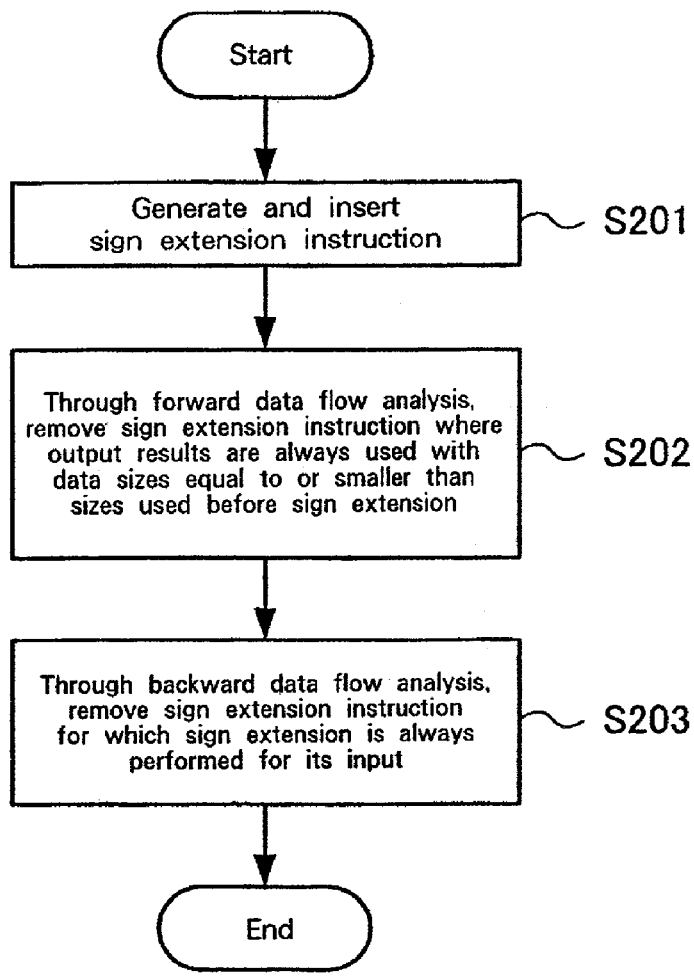
FIG. 2 is a flowchart showing the processing performed by the compiler in FIG. 1, from the time a sign extension instruction is inserted until the sign extension instruction is removed.

FIG. 2 is a flowchart for the processing in this embodiment, from the insertion of a sign extension instruction by the sign extension instruction generator 11 (step 201) to the removal of a sign extension instruction by the sign extension instruction removal unit 12 (steps 202 and 203).

Figure 3:
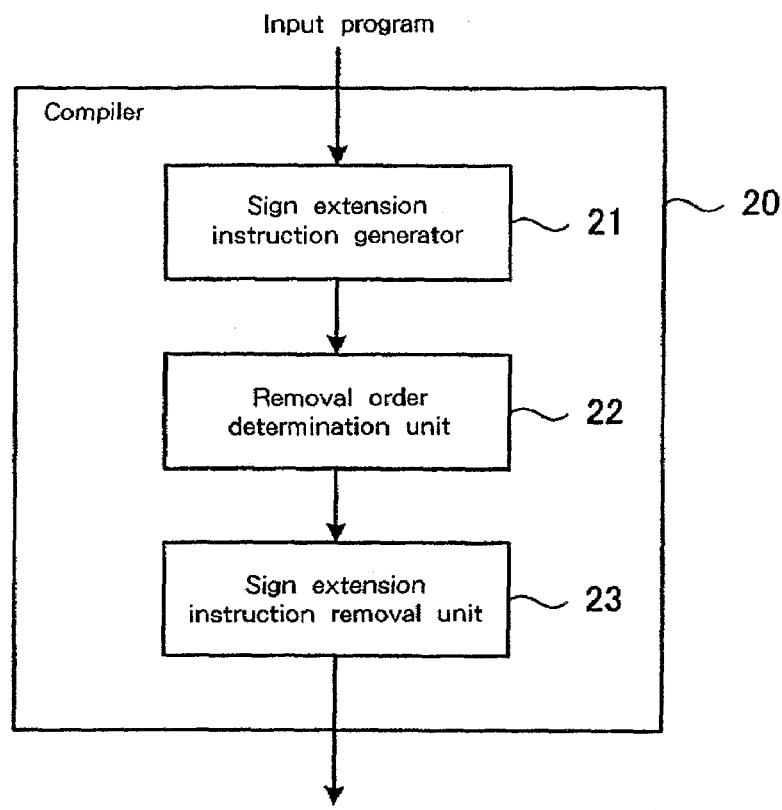
FIG. 3. is a diagram for explaining the general configuration of a compiler according to another embodiment of the present invention.

Another embodiment of the present invention will now be described. FIG. 3 is a diagram for explaining a general configuration of a compiler according to the embodiment. Instead of the compiler 10 provided for the computer in FIG. 17, in FIG. 3 a compiler 20 is provided. In this embodiment, suppose that an input program is written based on the assumption that it will be run by a CPU having a 32-bit architecture, and that an output program that is compiled by the compiler 20 in FIG. 3 is actually run by a CPU having a 64-bit architecture. Therefore, when the output program written in machine language code is generated using the source code written for the input program, the compiler 20 inserts sign extension instructions into necessary portions of the program. Further, in the embodiment explained while referring to FIGS. 1 and 2, many redundant sign extension instructions can be removed. Whereas in the following cases unnecessary sign extension instructions can not be removed and remain in the program. Specifically, when an induced variable in a loop is used as an index for an array, a sign extension instruction relative to this variable can not be removed. This is true because since the register size is used to calculate the address at which an array can be accessed, the sign extension instruction does not match the removal condition in the output result analysis process (see step 202 in FIG. 2). Further, as another reason, since the variable is updated in the loop, the sign extension instruction also does not match the removal condition in the input analysis process (step 203 in FIG. 2).

Furthermore, in the embodiment in FIGS. 1 and 2, under certain specific conditions, the sign extension instruction is not always efficiently removed. For example, when a sign extension instruction can be removed only outside or inside a loop in the program, in order to improve the execution speed of the compiled program, it is better to remove the sign extension instruction inside the loop process that has a high execution frequency. However, in the output results analysis process, for which backward data flow analysis is used, a sign extension instruction at the end of the execution sequence tends not to be removed. On the other hand, in the input analysis process, for which forward data flow analysis is used, a sign extension instruction at the front of the execution sequence tends not to be removed. In either case, since the structure of a loop and the execution frequency of instructions are not taken into account, depending on the order in which a program is written, a sign extension instruction inside a loop may not be removed.

According to the embodiment in FIG. 3, however, an unnecessary sign extension instruction can be effectively removed. While referring to FIG. 3, the compiler 20 in this embodiment comprises: a sign extension instruction generator 21, for generating a sign extension instruction that is to be added to a program; a removal order determination unit 22, for determining the order in which unnecessary sign extension instructions are to be removed; and a sign extension instruction removal unit 23, for actually removing sign extension instructions.

The components of the compiler 20 in FIG. 3 are virtual software blocks implemented by a CPU controlled by a computer program. The computer program for controlling the CPU is provided by storing it on a storage medium, such as a CD-ROM or a floppy disk, or by being transmitted via a network. The components of the compiler 20 in FIG. 3 represent the characteristic functions of this embodiment. Although not shown, the compiler 20 actually includes other general functions required for the compiling process, such as the phrase analysis and syntax analysis performed for an input program and the generation of code in a machine language.

As well as the sign extension instruction generator 11 of the compiler 10 in FIG. 1, the sign extension instruction generator 21 of the compiler 20 inserts sign extension instructions into all the locations wherein the value of a data variable having a size smaller than the register size (64 bits) is defined in the architecture of a computer that executes a compiled program that is output.

The removal order determination unit 22 determines the order in which sign extension instructions are to be removed, beginning with the sign extension instructions that it is assumed are the most frequently executed when the program (compiled program) output by the compiler 20 is executed. Through this processing, when there are multiple sign extension instructions that should be selected for removal, sign extension instructions having high execution frequencies can be removed, so that the execution speed of the compiled program can be increased.

Specifically, assume that only one of the sign extension instructions present outside and inside the loop in the program can be removed. In this case, since the sign extension instruction inside the loop has a higher execution frequency, it is advantageous that the sign extension instructions be removed in order, beginning with the innermost one nested in the loop. In addition, a program includes paths that are always executed and paths that are executed conditionally. When only one of the sign extension instructions written in two such paths can be removed, advantageously, the sign extension instruction in the path that is always executed is removed.

FIG. 8 is a diagram showing an example algorithm for mounting the removal order determination unit 22 in the compiler 20. In FIG. 8, EliminateOneExtend(I) represents the shifting of one sign extension instruction I to the removal process, which will be described later.

The execution frequency of each sign extension instruction can be determined and set depending on specific conditions. When it can not be determined which sign extension instruction has the higher execution frequency, the sign extension instructions need only be removed in the order consonant with the forward data flow analysis or the backward data flow analysis.

When multiple sign extension instructions can only be selectively removed, in many cases, the sign extension instructions for the calculation of addresses for array accesses may be removed at one portion in the calculation process performed for an array index. Therefore, due to the removal at a specific location of a sign extension instruction, another sign extension instruction may not be removed.

The sign extension instruction removal unit 23 removes sign extension instructions in the removal order established by the removal order determination unit 22. Further, under specific conditions, the sign extension instruction removal unit 23 in this embodiment removes sign extension instructions that are added to array indexes in order to calculate addresses for array accesses.

Figure 4:
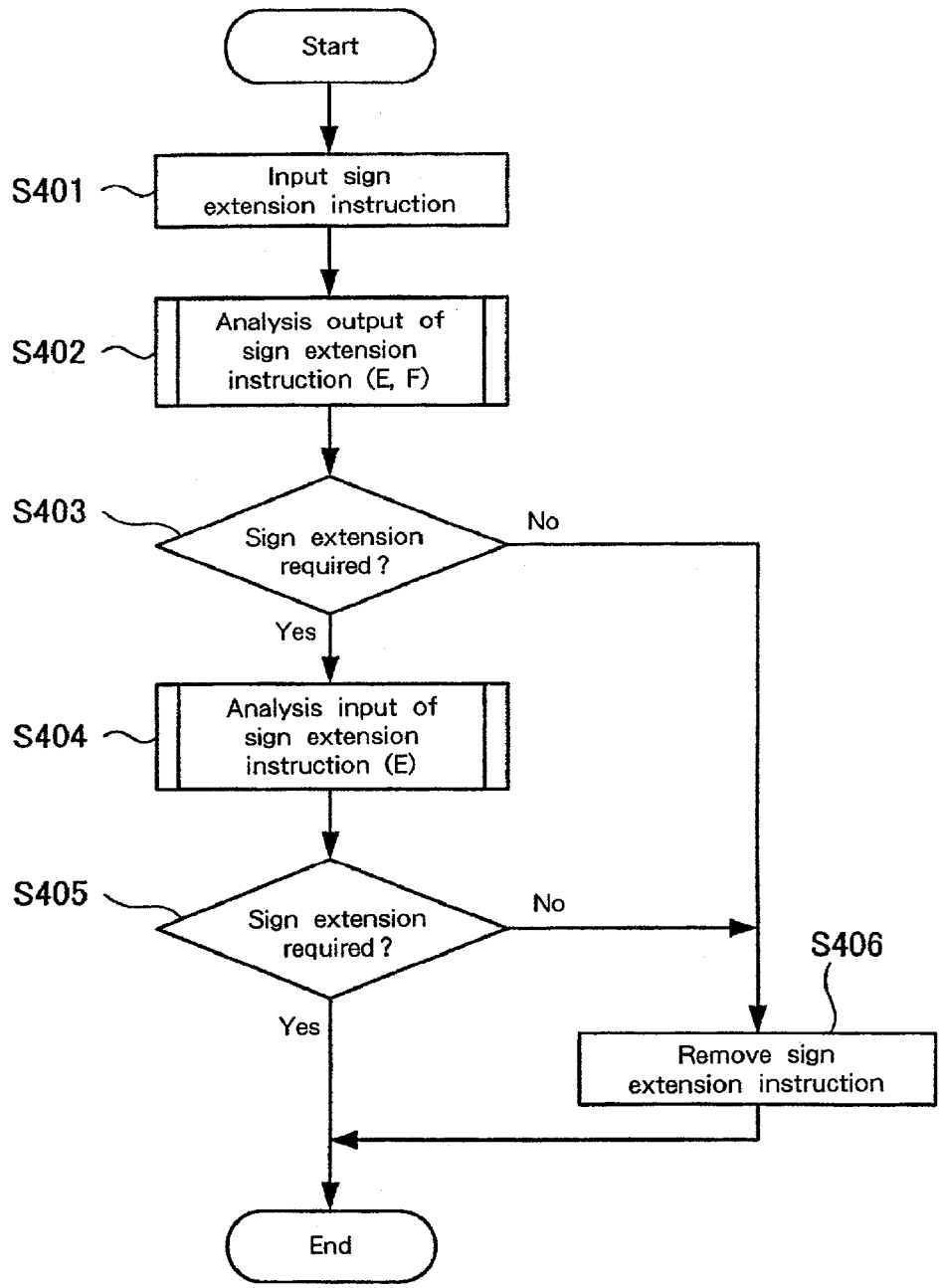
FIG. 4 is a flowchart for explaining the processing performed by the sign extension instruction removal unit of the compiler in FIG. 3 when removing a sign extension instruction from a program.

FIG. 4 is an example of a flowchart for explaining the processing performed by the sign extension instruction removal unit 23 when removing a single sign extension instruction from a program. Following the order established by the removal order determination unit 22, the sign extension instruction removal unit 23 in FIG. 4 performs the process for the removal of sign extension instructions, and removes sign extension instructions as needed.

As is shown in FIG. 4, first, the sign extension instruction removal unit 23 sequentially inputs sign extension instructions to be processed (step 401). Following which, as the sign extension instructions are input, an output analysis process is performed for each of them (step 402), and whether sign extension is required is determined in accordance with the analysis results (step 403). The analysis process and the determination process will be described later in detail. When it is ascertained that a sign extension is not required, that pertinent sign extension instruction is removed (step 406).

When whether or not sign extension is required can not be determined by using the output analysis, the input of the sign extension instruction is analyzed (step 404), and whether sign extension is required is determined in accordance with the analysis results (step 405). The analysis process and the determination process will also be described in detail later. When it is ascertained that sign extension is not required, the pertinent sign extension instruction is removed (step 406). Further, when whether the sign extension is required can not be determined, even by using the input analysis results, the sign extension instruction is not removed, and the processing is thereafter terminated. The analysis and determination process related to the output of a sign extension instruction (steps 402 and 403) and the analysis and determination process related to the input of a sign extension instruction (steps 404 and 405) may be performed in inverted order.

FIG. 9 is a diagram showing an example algorithm for the mounting of the sign extension instruction removal unit 23 in a compiler 20. In FIG. 9, a DU-chain (Definition-Use chain) is employed for the analysis process performed for the output of a sign extension instruction, and a UD-chain (Use-Definition chain) is employed for the analysis process for the input of a sign extension instruction. It should be noted that the DU-chain and the UD-chain are prepared before the process is initiated by the sign extension instruction removal unit 23. In FIG. 9, EXT and Extend, and the Extend instruction represent the sign extension instructions (these are applied in FIGS. 10 to 16).

Cases wherein the sign extension instruction can be removed are 1. a case wherein the sign extension has always been previously performed for the input (value) of the sign extension instruction, and
2. a case wherein the output results of a sign extension instruction are used for all the locations wherein the data size is equal to or smaller than the input size.

Therefore, the establishment of the second condition for the analysis and determination process is determined at steps 402 and 403, and the establishment of the first condition for the analysis and determination process is determined at steps 404 and 405. However, as is described above, only under these conditions does a sign extension instruction that is added to the array index in order to calculate the address of an array tend not to be removed.

However, in a language such as Java, C or C++, whose specifications define the inhibition of an array using a negative index, it can be determined that in specific conditions sign extension is not required by assuming that a negative value is never inserted into an array index (Theorem 1, Theorem 2 and Theorem 3). In the analysis process (step 402) for the output of a sign extension instruction, a check is performed to determine whether a sign extension instruction that has been added to an array index for the calculation of an address for an array matches not only the second condition, but also Theorems 1, 2 and 3. When the sign extension instruction matches the Theorems 1, 2 and 3, the instruction is removed. Each Theorem will now be described.

<Theorem 1>

When both of the following two conditions are satisfied, a sign extension from 32 to 64 bits is not required for array index a for the calculation of an address for an array accessed by the array index a.

(1) The higher 32 bits of the array index a are initialized to 0.

(2) In accordance with the language specification, 0≦the lower 32 bits of the array index a≦0x7fffffff is established for the lower 32 bits of the array index a.

<Demonstration>

Based on condition (1), the available range for the array index a is 0 to 0xffffffff, and based on condition (2), 0≦the array index a≦0x7fffffff is established, so that the index value is not a negative value. Therefore, sign extension is not required.

<Theorem 2>

When all of the following three conditions are satisfied, the sign extension from 32 to 64 bits is not required for an array index (a+b) for the calculation of the address of an array accessed by the array index (a+b).

(1) Sign extensions have already been performed for array indexes a and b.

(2) Either the value of the array index a or the value of the array index b falls within the range 0 to 0x7fffffff.

(3) In accordance with the language specification, 0≦the lower 32 bits of the array index (a+b)≦0x7fffffff is established for the lower 32 bits of the array index (a+b).

<Demonstration>

Since the array index a and the array index b in (a+b) are interchangeable, only a case wherein the array index a matches condition (2) need be demonstrated, so that accordingly, a case wherein the array index b matches condition (2) can be demonstrated. Therefore, an explanation will now be given for the case wherein the array index a matches condition (2), i.e., the case wherein the array index a falls within the range 0 to 0x7fffffff.

i) When the array index b falls within the range 0 to 0x7fffffff: The available range for the array index (a+b) is 0 to 0xffffffff, and since it is guaranteed that the higher 32 bits are 0, in accordance with Theorem 1 sign extension is not required.

ii) When the array index b falls within the range 0xffffffff80000000 to 0xffffffffffffffff: The available ranges for the array index (a+b) are from 0xffffffff80000000 to 0xffffffffffffffff and from 0 to 0x7fffffff. In accordance with condition (3), 0≦the array index (a+b)<0x7fffffff is established, and the array index (a+b) is not a negative value. Therefore, sign extension is not required.

When the maximum size of an array is limited (or can be limited) to a specific value, the following Theorem 3 can be introduced by extending Theorem 2. By using Theorem 3, the sign extension instruction can be removed even when one of the array indexes is represented by the addition of a negative value. For example, in the language specification for Java, the maximum size of an array is 0x7fffffff. Thus, so long as either value of the array index a or b falls within a range of from −1 to 0x7fffffff and so long as the sign extension is performed for both of the array indexes a and b, sign extension for the array index (a+b) is not required for the calculation of an address for the array accessed by the array index (a+b). As another example, assume that the maximum size of an array can be limited to 0x1ffffff, due to a limitation imposed for the mounting of the array in the language processing system. Then, so long as either value of the array index a or b falls within the range of from 0xffffffff9fffffff (−1610612737) to 0x7fffffff, and sign extension is performed for both array indexes a and b, and sign extension of the array index (a+b) is not required for the calculation of the address for an array accessed by the array index (a+b).

<Theorem 3>

When all of the following four conditions are satisfied, sign extension of the array index (a+b) from 32 to 64 bits is not required for the calculation of the address of an array accessed by the array index (a+b).

(1) The upper size limit of the array is provided as maxlen, and 0≦maxlen≦0x7fffffff is established.

(2) Sign extension has already been performed for both of the array indexes a and b.

(3) Either value of the array index a or b falls within a range of from (maxlen−1)—0x7fffffff to 0x7fffffff.

(4) According to the language specification, 0≦the lower 32 bits of the array index (a+b)<maxlen≦0x7fffffff is established for the lower 32 bits of the array index (a+b).

<Demonstration>

Since the array indexes a and b in (a+b) are interchangeable, only a case wherein the array index a matches condition (3) need be demonstrated, so that accordingly, a case wherein the array index b matches condition (3) can be demonstrated. Therefore, an explanation will be given for the case wherein the array index a matches condition (3).

a) Case wherein the array index a falls within a range of 0 to 0x7fffffff According to Theorem 2, sign extension is not required.

b) Case wherein the array index a falls within a range of (maxlen−1)—0x7fffffff to 0xffffffffffffffff i) When the array index b falls within a range of 0 to 0x7fffffff: According to Theorem 2, the sign extension is not required.

ii) When the array index b falls within a range of 0xffffffff80000000 to 0xffffffffffffffff: The available range for the array index (a+b) is 0xffffffff00000000+maxlen to 0xfffffffffffffffe, and the available range for the lower 32 bits of the array index (a+b) is maxlen to 0xfffffffe. Since condition (4) is never established, this case is external to the condition, and sign extension is required.

A detailed explanation will now be given for the analysis and determination processing (steps 402 and 403), performed by the sign extension instruction removal unit 23 in FIG. 4, for the output value of the sign extension instruction.

Figure 5:
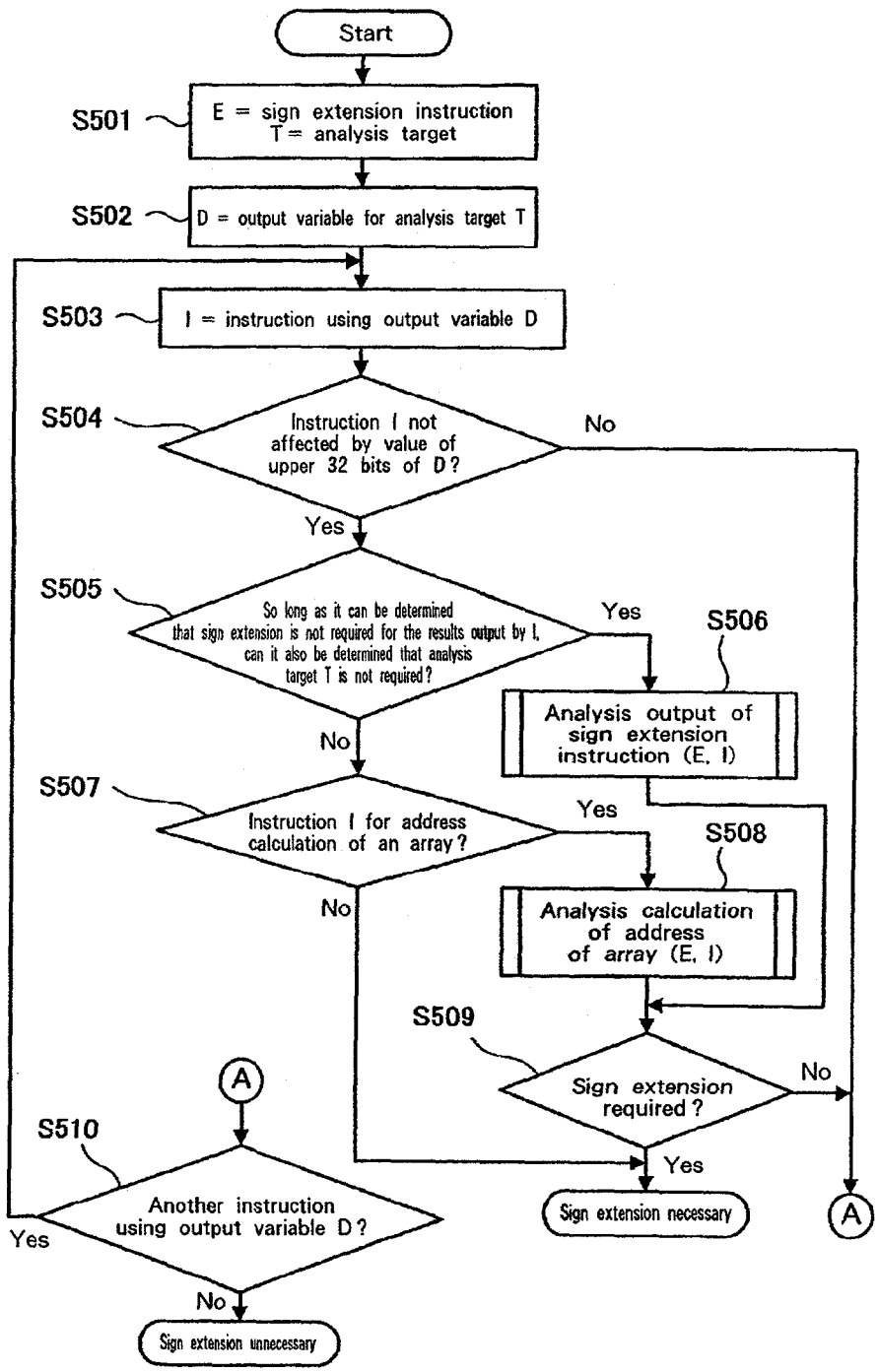
FIG. 5 is a flowchart for explaining the process, during the operation shown in FIG. 4, for analyzing the output of a sign extension instruction.

FIG. 5 is an example of a flowchart for explaining the analysis process for the output of a sign extension instruction. As is described above, this process includes a process for employing the Theorems 1, 2 and 3 to determine whether a sign extension instruction added for the calculation of an address for an array is necessary.

As is shown in FIG. 5, the sign extension instruction removal unit 23 regards a sign extension instruction as E, and the value of an analysis target as T (step 501). Then, the output variable of the analysis target T for the sign extension instruction E is defined as D (step 502), and an instruction using the output variable D is defined as I (step 503). A check is performed to determine whether the instruction I is not affected by the value of the higher 32 bits of the output variable D (step 504).

When the instruction I will be affected by the value of the higher 32 bits of the output variable D, once it has been ascertained that the sign extension is not required for the output results of the instruction I, the sign extension instruction removal unit 23 determines whether the analysis target T is also not necessary (step 505). When it is ascertained that the analysis target T is not necessary, the sign extension instruction removal unit 23 recursively calls and performs the processing in FIG. 5 relative to the output results of the instruction I (step 506). An instruction for which the analysis target T can be determined to not be necessary is, for example, a COPY instruction.

When it is ascertained at step 505 that the analysis target T is necessary, the sign extension instruction removal unit 23 determines whether the instruction I is an instruction for calculating the address of an array (step 507). When the instruction I is an instruction for calculating the address of an array, the analysis process for the instruction is performed (step 508). When the instruction I is not an instruction for calculating the address of an array, at step 403 in FIG. 4 it is ascertained that the sign extension instruction E is necessary. Further, when it is ascertained through the analysis processes at steps 506 and 508 that sign extension is necessary, at step 403 in FIG. 4 it is determined that the sign extension instruction E is necessary (step 509).

When, at step 504, the instruction I is not affected by the value of the higher 32 bits of the output variable D, and when it is ascertained at step 509 that the sign extension is not required, the sign extension instruction removal unit 23 determines whether another instruction using the output variable D is present. If there is such an instruction, the above process is repeated while this instruction is defined as a new instruction I (steps 510 and 503).

When there is no other instruction using the output variable D, i.e., when it can not be ascertained that the sign extension instruction E is necessary for all the instructions using the output variable D, at step 403 in FIG. 4, it is ascertained that the sign extension instruction E is unnecessary.

FIG. 10 is a diagram showing an example algorithm whereby the sign extension instruction removal unit 23 performs the analysis and determination processes in FIG. 5 for the output of the sign extension instruction (<analysis to determine whether an Extend instruction for USE is required> (Ext, I) in FIG. 9). In FIG. 10, the code from the fifth line "case clear integer cast instruction:" to the eleventh line "case right shift instruction without code:" corresponds to the conditional branch at step 504. Further, the code from the thirteenth line "case addition instruction:" to the twentieth line "case copy instruction:" corresponds to the conditional branch at step 505. The code on the twenty-sixth line "case array address calculation:" corresponds to the conditional branch at step 507.

Figure 6:
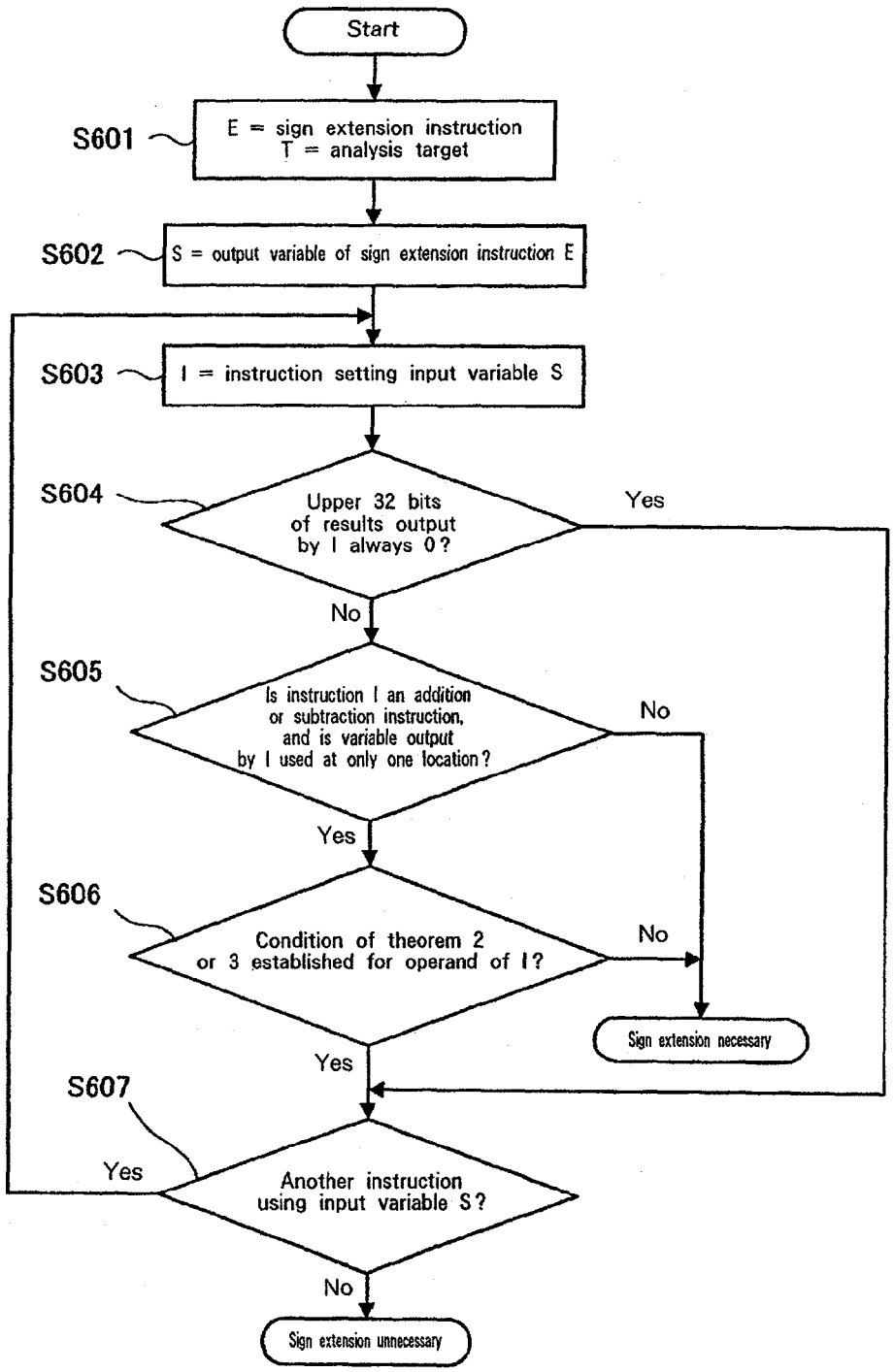
FIG. 6 is a flowchart for explaining a process, during the operation in FIG. 5, for analyzing an instruction used to calculate an address of an array.

The process at step 508 will now be described. FIG. 6 is a flowchart for explaining the analysis process performed for an instruction for calculating the address of an array. As is shown in FIG. 6, the sign extension instruction removal unit 23 defines a sign extension instruction as E and the value of a target to be analyzed as T (step 601). Further, the input variable of the sign extension instruction E is defined as S (step 602), and an instruction for setting the input variable S is defined as I (step 603). A check is performed to determine whether the higher 32 bits of the output results for the instruction I is always 0 (step 604). This determination corresponds to the employment of the Theorem 1.

When the higher 32 bits of the output results for the instruction I can not always be 0, the sign extension instruction removal unit 23 determines whether the instruction I is an addition instruction or a subtraction instruction, and whether the output variable for the instruction I is used at only one location (step 605). When this instruction I satisfies the condition, the sign extension instruction removal unit 23 determines whether the condition for Theorem 2 or for Theorem 3, obtained by extending Theorem 2, is established for the operand of the instruction I (step 606).

When the instruction I does not satisfy the condition at step 605, or when the condition for Theorem 2 or 3 is not established for the operand of the instruction I, at step 403 in FIG. 4 it is ascertained that the sign extension instruction E is necessary.

When it is ascertained at step 604 that the value of the upper 32 bits of the output results of the instruction I is always 0, and when the condition for Theorem 2 or 3 is established for the operand of the instruction I at step 606, the sign extension instruction removal unit 23 determines whether there is another instruction that employs the input variable S. If there is such an instruction, the process is repeated while this applicable instruction is used as a new instruction I (steps 607 and 603).

When there is no other instruction that employs the input variable S, i.e., when it can not be ascertained that the sign extension instruction E is required for all the instructions that employ the input variable S, it is ascertained at step 403 in FIG. 4 that the sign extension instruction E is not necessary.

FIG. 11 is a diagram showing an example algorithm whereby the sign extension instruction removal unit 23 performs the analysis process in FIG. 6 for the instruction for the address calculation of an array (<analysis to determine whether Extend instruction is required for calculation of address for an array> in FIG. 10 (EXT, I (EOP2 in FIG. 11))). The use of Theorem 3 is entered in the ninth and tenth lines in FIG. 11; however, Theorem 2 is employed depending on the language specification. When Theorem 2 is employed, the portion in the condition, "either operand in D is equal to or greater than −1" is changed to "either operand of D is equal to or greater than 0".

A detailed explanation will now be given for the analysis and determination processes (steps 404 and 405) performed in FIG. 4, by the sign extension instruction removal unit 23, for the input value of the sign extension instruction.

Figure 7:
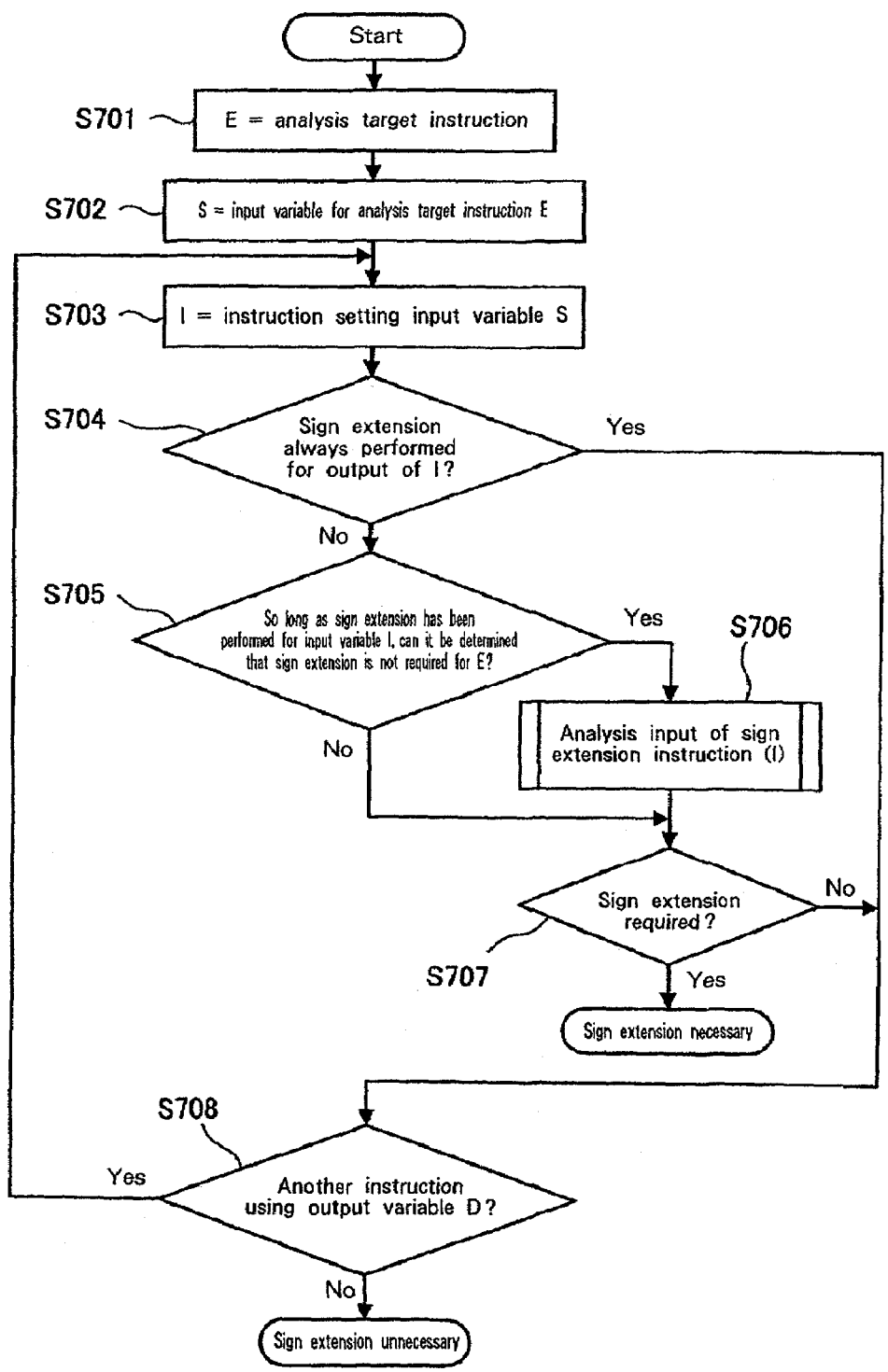
FIG. 7 is a flowchart for explaining the analysis process performed in the operation in FIG. 4 for the input of a sign extension instruction.

FIG. 7 is a flowchart for explaining the analysis process for the input value of the sign extension instruction. As is shown in FIG. 7, the sign extension instruction removal unit 23 defines as E a sign extension instruction to be analyzed (step 701), defines as S the input variable of the instruction E (step 702), and defines as I the instruction for setting the input variable S (step 703). Then, a check is performed to determine whether sign extension is always performed for the output of the instruction I (step 704). An instruction for which sign extension is always performed for the output of the instruction I is an instruction for returning an array.

When sign extension is not always performed for the output of the instruction I, the sign extension instruction removal unit 23 determines whether it can be ascertained that the sign extension instruction E to be analyzed is also not necessary, so long as sign extension has been performed for the input variable S of the instruction I (step 705). When it is ascertained that the sign extension instruction E is also unnecessary, the sign extension instruction removal unit 23 recursively calls and executes the processing in FIG. 7 relative to the input of the instruction I (step 706). An instruction for which it can be determined that the sign extension instruction E is not always necessary is, for example, the COPY instruction.

When, at step 705, it is ascertained that the sign extension instruction E to be analyzed is necessary, even when sign extension has been performed for the input variable S of the instruction I, at step 403 in FIG. 4 it is determined that the sign extension instruction E is necessary (step 707). Further, also when, as a result of the analysis process at step 706, it is determined that the sign extension is required, at step 403 in FIG. 4 it is ascertained that the sign extension instruction E is necessary (step 707).

When at step 704 sign extension is always performed for the output value of the instruction I, and when it is ascertained at step 707 that sign extension is not required, the sign extension instruction removal unit 23 determines whether there is another instruction that employs the input variable S. If there is such an instruction, the above described process is repeated while this instruction is used as a new instruction I (steps 708 and 703). When there is no other instruction that sets the input variable S, i.e., when it can not be ascertained that the sign extension instruction is necessary for all the instructions that set the input variable S, it is ascertained at step 403 in FIG. 4 that the sign extension instruction E is unnecessary.

FIG. 12 is a diagram showing an example algorithm whereby the sign extension instruction removal unit 23 performs the analysis and determination processes in FIG. 7 for the input value of the sign extension instruction (<analysis to determine whether Extend instruction is required for Destination> (I) in FIG. 9). In FIG. 12, the fifth line "case the output results of I are in the sign extension state:" corresponds to the conditional branch at step 704, and the eighth line "case copy instruction:" corresponds to the conditional branch at step 705.

An explanation will now be given for an example process for adding a sign extension instruction to or for removing it from a sample program. FIG. 13 is a diagram showing a sample program according to the embodiment into which a sign extension instruction is inserted and from which it is removed. In this example, the compiler 20 in FIG. 3 is used to insert and remove a sign extension instruction relative to the sample program, and the individual processes are performed in accordance with the algorithms in FIGS. 8 to 12. First, the sample program in FIG. 13 is passed through the compiler 20, and the sign extension instruction generator 21 inserts a sign extension instruction into the sample program.

FIG. 14 is a diagram showing an intermediate expression in the state wherein the sign extension instruction (extend) is generated at predetermined locations in the sample program in FIG. 13. In FIG. 14, lines (2), (4), (7), (9) and (15) are sign extension instructions. Next, based on the algorithm in FIG. 8, the removal order determination unit 22 determines the order in which to remove the sign extension instructions in the sample program in FIG. 14. In this example, it is determined that the sign extension instructions are to be removed in order beginning with the instruction in the sample program that is executed most frequently, i.e., in the order (15), (2), (4), (7) and (9).

First, removal of the sign extension instruction at (15) is performed.

USE locations (instructions employing the output results) for destination (15) are instructions at (11), (12), (13), (14), (15) and (16). Based on the algorithm <analysis to determine Extend instruction for USE is necessary> in FIGS. 9 and 10, the sign extension instructions other than at (12) are determined to be unnecessary. Further, based on the algorithm <analysis to determine whether Extend instruction is necessary for the address calculation of an array> in FIGS. 10 and 11, the sign extension instruction at (12) is determined to be unnecessary. Thus, the sign extension instruction at (15) is removed.

Then, removal of a sign extension instruction at (2) is performed. Since the USE location for the destination (2) is (5), which is a copy instruction, based on the algorithm in FIG. 10, the instruction that uses the results output by the instruction at (5) is analyzed. Since the USE location for destination (5) is (6), which is a subtraction instruction, based on the algorithm in FIG. 10, an instruction that employs the output results of the instruction at (6) is analyzed. Since the USE location for destination (6) is (7), which is a sign extension instruction, based on the algorithm in FIG. 10, this sign extension instruction is determined to be unnecessary. As a result, the sign extension instruction at (2) is removed.

Next, removal of a sign extension instruction at (4) is performed. USE locations for destination (4) are the instructions at (10) and (16). Based on the algorithm <analysis to determine whether Extend instruction is necessary for USE> in FIGS. 9 and 10, the sign extension instruction is determined to be unnecessary. As a result, the sign extension instruction at (4) is removed.

Following this, removal of a sign extension instruction at (7) is attempted. USE locations for destination (7) are the instructions at (10), (11), (12), (13), (14) and (16). These instructions are analyzed using the algorithms in FIGS. 9 and 10. An instruction for USE at (12) (the use of the output results at (7)) is determined to be necessary because the instruction at (15) was removed previously. As a result, the sign extension instruction at (7) is not removed.

Subsequently, removal of a sign extension instruction at (9) is performed. A USE location for destination (9) is (11), and based on the algorithm <analysis to determine whether Extend instruction is necessary for USE> in FIGS. 9 and 10, the sign extension instruction is determined to be unnecessary. As a result, the sign extension instruction at (9) is removed. Through the above processing, the sign extension instructions other than (7) are removed.

FIG. 15 is a diagram showing the results obtained by removing the sign extension instructions from the program in FIG. 14, while taking the removal order into account.

Assume that the compiler 10 in FIG. 1 is employed to add a sign extension instruction to or remove it from the sample program in FIG. 13. The individual processes are performed based on the algorithms in FIGS. 9 to 12.

First the sign extension instruction generator 11 adds a sign extension instruction to the sample program in FIG. 13, and obtains the program shown in FIG. 14. Since the compiler 10 in FIG. 1 does not include means for determining the removal order in accordance with the execution frequencies of the sign extension instructions, it is assumed that the sign extension instructions are to be removed beginning, for example, with the first one in the program.

In the same manner as described above, the removal of the sign extension instructions (2) and (4) and then the removal of the sign extension instruction (7) are attempted. USE locations for destination (7) are instructions at (10), (11), (12), (13), (14) and (16). Therefore, based on the algorithm <analysis to determine whether Extend instruction for USE is necessary> in FIGS. 9 and 10, sign extension instructions other than at (12) are determined to be unnecessary. Further, based on the algorithm <analysis to determine whether Extend instruction is necessary for address calculation of an array> in FIGS. 10 and 11, the sign extension instruction is determined to be unnecessary. Thus, the sign extension instruction at (7) is removed.

The sign extension instruction at (9) is removed in the same manner, and the removal of the sign extension instruction at (15) is attempted. USE locations for destination (15) are instructions at (11), (12), (13), (14), (15) and (16). The instruction for USE at (12) (the use of the results output by (15)) is determined to be necessary because the instruction at (7) was removed previously. Therefore, the sign extension instruction at (15) is not removed. Through this processing, sign extension instructions other than at (15) are removed.

FIG. 16 is a diagram showing the results obtained by removing the sign extension instructions without taking the removal order into account. When the results in FIGS. 15 and 16 are compared, one of the sign extension instructions (7) and (15) is removed and the other is maintained. In either case, when the sign extension instructions (2), (4) and (9) and either the sign extension instruction (7) or (15) are removed, the program execution efficiency can be improved. The performance level can be expected to be increased twice for a numerical calculation program (method level), or about a maximum of 12 percent for an application program. However, the execution speed is reduced when rather than retaining the sign extension instruction (7) the sign extension instruction (15) is retained in the loop. Thus, 4since the sign extension instruction (15) would be removed, it can be understood that a greater increase in program execution efficiency is possible if the removal order is used for the removal of the sign extension instructions.

In the above embodiments, a compiler has been used to carry out the functions for the addition and removal of sign extension instructions. However, according to the present invention, in addition to the compiler, program conversion means may be provided for a computer, so that sign extension instructions are generated using a predetermined program, and redundant sign extension instructions are removed. Further, program conversion means may be provided for a computer for detecting sign extension instructions, inserted into a program in advance, and for removing redundant instructions. Further, the languages to be processed are not limited to compiled languages, but may also include applicable interpreted languages (e.g., a method for removing a sign extension instruction when the input value of the sign extension instruction indicates that the sign extension is not required).

As is described above, according to the invention, redundant sign extension instructions can be removed from a program, so that the execution efficiency of the program can be improved. Further, according to the present invention, a compiler can be provided that can remove redundant sign extension instructions during the compiling of a program, and that can generate an object program for which the execution efficiency is high.

The present invention includes a method comprising enabling a processor in a computer system to convert an execution program, including the steps of: enabling the processor to analyze sign extension instructions to be issued in order to perform sign extension of a value defined in the execution program; and employing analysis results in enabling the processor to remove a redundant sign extension instruction from those included in said execution program.

In some embodiments the method includes performing sign extension for a value before said value is input to a certain sign extension instruction. In some cases, the step of employing includes removing said certain sign extension instruction.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. It can also be implemented as a method, system or apparatus to implement the functions of a computer program product described herein.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer program product, comprising a computer usable medium having computer program logic recorded thereon for enabling a processor in a computer system to convert an execution program, the computer program logic comprising:

analyzing means for enabling the processor to analyze sign extension instructions to be issued in order to perform the sign extension of a value defined in said execution program;

a removal order determination unit to determine the order in which sign extension instructions are to be removed by determining (i) the frequencies of execution of the sign extension instructions during execution of the program, and (ii), considering the sign extension instructions in the order of said frequencies of execution, whether each of the sign extension instructions is redundant, including for each of the sign extension instructions in the order of said frequencies of execution, identifying all places in said execution program where a value output from the sign extension instruction is used, determining if said value is needed at each of said all places, and if said value is not needed at each one of said all places, determining said each of the sign extension instructions to be redundant; and removal means, responsive to analysis results and the removal order determination unit, for enabling the processor to remove a redundant sign extension instruction determined to be redundant from those included in said execution program.

2. The computer program product according to claim 1, wherein, when sign extension has been performed for a value before said value is input to a certain sign extension instruction, said removal means enables the processor to remove such sign extension instruction.

3. The computer program product according to claim 1, wherein, when the output result of a sign extension instruction is employed at all places where it is required using a data size equal to or smaller than the size before sign extension, said removing means enables the processor to remove such sign extension instruction.

4. A computer program product according to claim 1, wherein the analyzing means causes the processor to analyze sign extension instructions by:

using a backward data flow analysis to determine whether certain results output by each sign extension instruction are used at all required locations; and employing a forward data flow analysis to determine for each sign extension instruction whether sign extension has already been performed for values input to said each sign extension instruction.

5. A computer program product according to claim 1, wherein:

the removal order determination unit identifies a set of types of sign extension instructions that cannot be removed;

any redundant sign extension instruction that is one of said types is not removed from said program; and one of said types in any sign extension instruction used to extend a valuable used to calculate an address at which an array can be accessed.

6. A computer program product, comprising a computer usable medium having computer program logic recorded thereon for enabling a processor in a computer system to convert the source code of a program written in a programming language into machine language code, the computer program logic comprising:

generation means for enabling the processor to add to said program a correction instruction for correcting a value of data size defined in said program that is smaller than a register size provided for the processor that executes said program;

a removal order determination unit to determine the order in which correction instructions are to be removed by determining (i) the frequencies of execution of the correction instructions during execution of the program, and (ii), considering the correction instructions in the order of said frequencies of execution, whether each of the correction instructions is redundant, including for each of the correction instructions in the order of said frequencies of execution, identifying all places in said execution program where a value output from the correction instruction is used, determining if said value is needed at each of said all places, and if said value is not needed at each one of said all places, determining said each of the correction instructions to be redundant; and removal means, responsive to said removal order determination unit, for enabling the processor to remove correction instruction determined to be redundant from among said correction instructions that have been added by said generation means from said program.

7. The computer program product according to claim 6, wherein said removal means removes the correction instruction that is added under predetermined conditions to perform address calculations for array accesses.

8. The computer program product according to claim 6, wherein, when the correction instruction for a predetermined value may be removed either outside or inside a loop in said program, said removal means removes the correction instruction located inside the loop.

9. The computer program product according to claim 6, wherein, to remove the correction instruction, said removal means employs a use-definition chain and a definition-use chain.

10. A computer comprising:

compiler means for compiling source code of a program to convert said source code into machine language code; and a processor for executing said machine language code, wherein, said compiler means includes a removal order determination unit to determine the order in which sign extensions are to be removed by determining (i) the frequencies of execution of the sign extension instructions during execution of the program, and (ii), considering the sign extension instructions in the order of said frequencies of execution, whether each of the sign extension instructions is redundant, including for each of the sign extension instructions in the order of said frequencies of execution, identifying all places in said execution program where a value output from the sign extension instruction is used, determining if said value is needed at each of said all places, and if said value is not needed at each one of said all places, determining said each of the sign extension instructions to be redundant; and said compiler means, responsive to said removal order determination unit, removes sign extension instructions, which have been inserted in said program to perform the sign extension of values defined in said program and which have been determined to be redundant.

11. The computer according to claim 10, wherein, when said sign extension has already been performed for an input value before being input to a predetermined sign extension instruction, said compiler means removes said predetermined sign extension instruction.

12. The computer according to claim 10, wherein, when the output results for a predetermined sign extension instruction are employed for all necessary locations having a data size equal to or smaller than the size before sign extension, said compiler means removes said predetermined sign extension instruction.

13. The computer according to claim 10, wherein, under a predetermined condition, said compiler means removes said correction instruction added for address calculation for array accesses.

14. A program conversion method for controlling a computer to convert a program comprising the steps of:
adding, to said program, a sign extension instruction for performing sign extension for a value defined in said program;
determining an order in which sign extension instructions are to be removed by determining (i) the frequencies of execution of the sign extension instructions during execution of the program, and (ii), considering the sign extension instructions in the order of said frequencies of execution, whether each of the sign extension instructions is redundant, including for each of the sign extension instructions in the order of said frequencies of execution, identifying all places in said execution program where a value output from the sign extension instruction is used, determining if said value is needed at each of said all places, and if said value is not needed at each one of said all places, determining said each of the sign extension instructions to be redundant; and
removing, responsive to said determined order, instructions determined to be redundant from among said sign extension instructions added to said program.

15. A method comprising enabling a processor in a computer system to convert an execution program, including the steps of:
enabling the processor to analyze sign extension instructions to be issued in order to perform sign extension of a value defined in the execution program;
determining an order in which sign extension instructions are to be removed by determining (i) the frequencies of execution of the sign extension instructions during execution of the program, and (ii), considering the sign extension instructions in the order of said frequencies of execution, whether each of the sign extension instructions is redundant, including for each of the sign extension instructions in the order of said frequencies of execution, identifying all places in said execution program where a value output from the sign extension instruction is used, determining if said value is needed at each of said all places, and if said value is not needed at each one of said all places, determining said each of the sign extension instructions to be redundant; and
employing analysis results and said determined order in enabling the processor to remove sign extension instructions determined to be redundant from those included in said execution program.

16. A method as in claim 15, further comprising performing sign extension for a value before said value is input to a certain sign extension instruction.

17. A method as in claim 16, wherein the step of employing includes removing said certain sign extension instruction.

18. An article of manufacture comprising a computer usable medium having computer readable program code means embodied therein for causing a processor in a computer system to convert an execution program, the computer readable program code means in said article of manufacture comprising computer readable program code means for causing a computer to effect the steps of claim 15.

19. A program storage device readable by machine, tangibly embodying a program of instructions executable by the machine to perform method steps for enabling a processor in a computer system to convert an execution program, said method steps comprising the steps of claim 15.

* * * * *